Patented May 10, 1927.

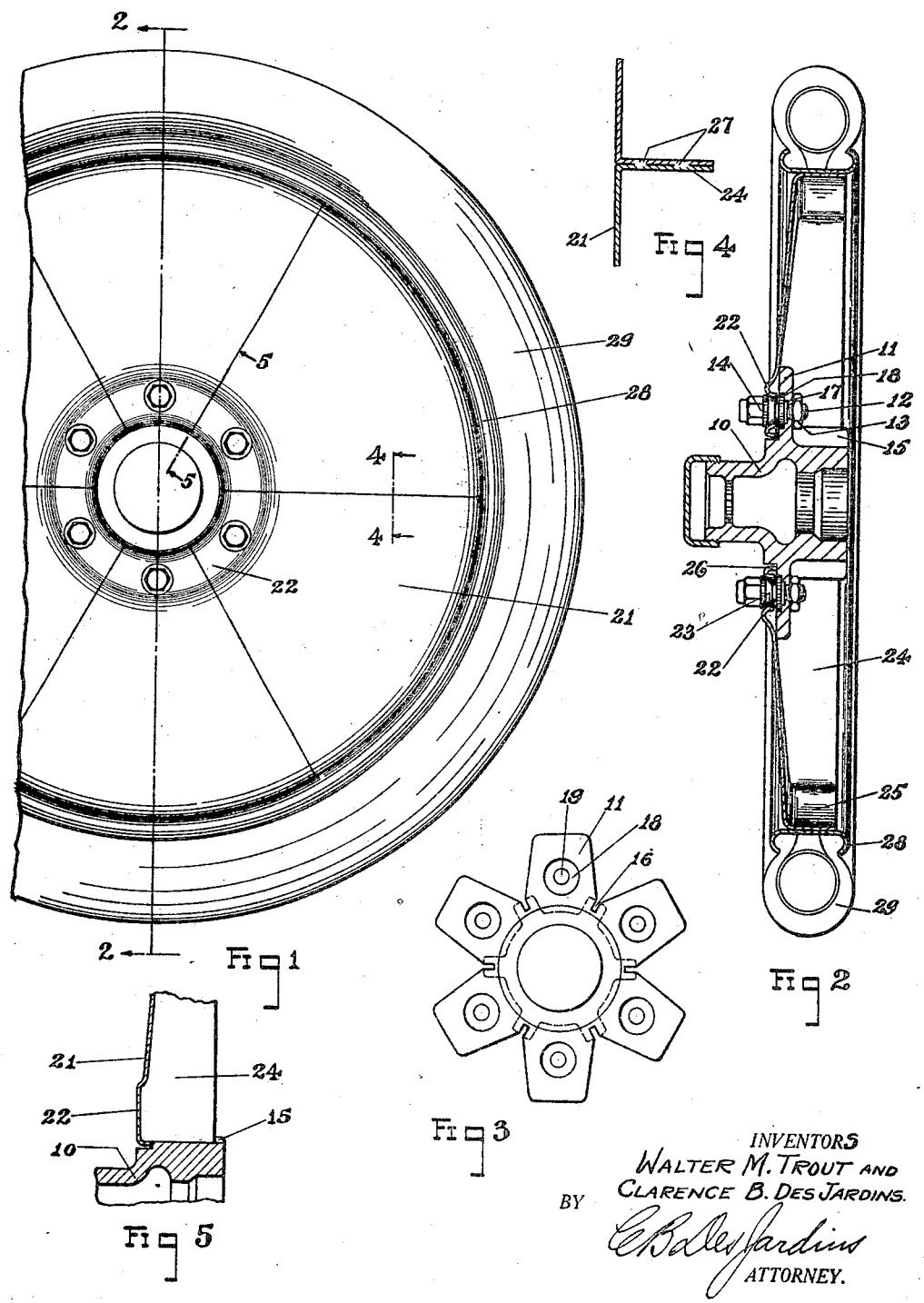

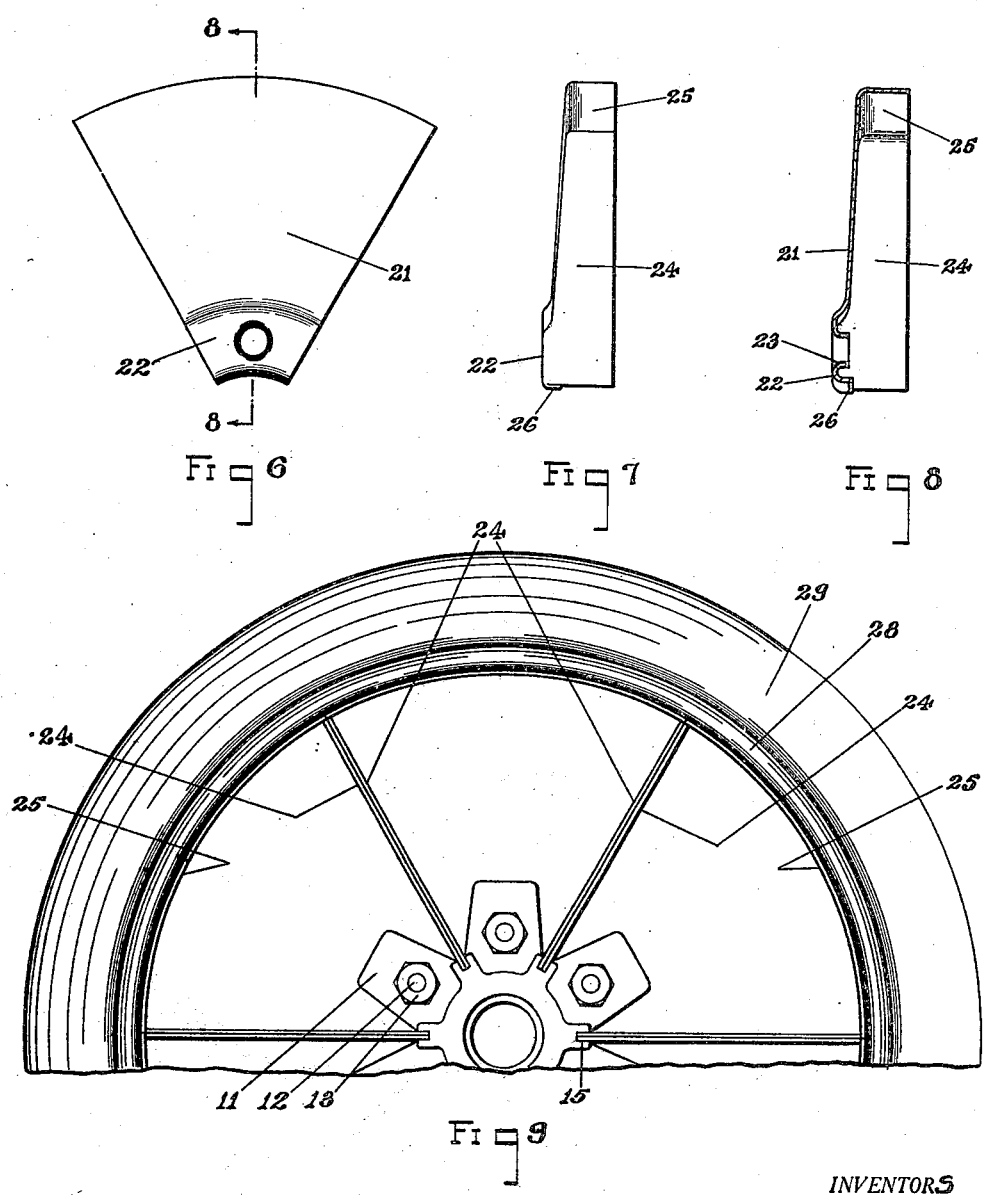

1,627,717

UNITED STATES PATENT OFFICE.

WALTER M. TROUT AND CLARENCE E. DES JARDINS, OF PHILADELPHIA, PENNSYLVANIA, ASSIGNORS TO BUDD WHEEL COMPANY, OF PHILADELPHIA, PENNSYLVANIA, A CORPORATION OF PENNSYLVANIA.

METAL VEHICLE WHEEL.

Application filed December 7, 1921. Serial No. 520,674.

This invention relates to improvements in metal vehicle wheels. The invention has to do, more particularly, with metal wheels of the single disc type adapted for automobiles.

The object of our invention is to provide a steel wheel suitable for use on automobiles in which the wheel disc is constructed of a plurality of stampings, which are relatively small and simple, so that the wheel may be manufactured at a low cost.

Another object of our invention is to provide a metal wheel in which the body of the wheel is made up of a plurality of segmental stampings secured together to form a wheel disc, giving the attractive appearance to the outside of the wheel which is characteristic of disc wheels in which the disc is formed from a single sheet of metal.

Another object of our invention is to provide a metal wheel of the single disc type in which the disc is made up of a plurality of segmental, sheet metal stampings having lateral flanges arranged in contact with the flanges of adjacent sections and rigidly secured thereto.

A further object of our invention is to provide a metal wheel, the greater portion of which may be constructed of sheet metal, which may be manufactured at a low cost and which is, at the same time, very strong and durable and light in weight.

Further objects, and objects relating to economies and details of construction and operation, will definitely appear from the detailed description to follow. Our invention is clearly defined and pointed out in the appended claims. A structure constituting a preferred embodiment of our invention is illustrated in the accompanying drawing, forming a part of this specification, in which:

Fig. 1 is a fragmentary view in elevation of a wheel embodying our invention.

Fig. 2 is a vertical section through the wheel, taken on the line 2—2 of Fig. 1.

Fig. 3 is a plan view of the wheel hub.

Fig. 4 is a detail, sectional view, taken on the line 4—4 of Fig. 1.

Fig. 5 is a detail, sectional view taken on the line 5—5 of Fig. 1.

Fig. 6 is a plan view of one of the segmental sections forming the wheel discs.

Fig. 7 is an end view of the same.

Fig. 8 is a vertical section through this segmental stamping, taken on the line 8—8 of Fig. 6, and Fig. 9 is a view in elevation of the wheel, looking at the inner side thereof.

In the drawings, the same reference numerals refer to the same parts throughout the several views and the sectional views are taken looking in the direction of the arrows at the ends of the section lines.

Our invention comprises a series of segmental, sheet metal stampings which are arranged edge to edge and connected together so as to form a wheel disc. These stampings, preferably, are provided with lateral flanges, which, when the sections or stampings are assembled, extend radially of the disc and are in contact with each other and rigidly united, the outer, curved edges of the segmental sections being aligned when the sections are assembled so as to form a cylindrical surface, serving as a support for the rim. In this particular embodiment, the rim is permanently secured to the curved flanges. The hub of the wheel is bolted to each of the several sections forming the wheel disc. The hub may be provided with a number of flanges extending radially and each of which carries a threaded stud extending through a perforated depression in one of the segmental sections. In this case, we prefer to fasten the wheel disc in place by means of ball-nuts screwed on these studs and seating in the perforated depressions. The contacting flanges on the several sections extend between the hub flanges and their inner ends may seat on the hub. We find that it is desirable to provide radial grooves in the hub which receive the inner ends of these contacting flanges.

The drawings in connection with this application illustrate a wheel which constitutes a preferred embodiment of our invention. This wheel comprises a hub, 10, having a plurality of radially-extending hub flanges, 11. Each of these flanges, 11, carries a threaded stud, 12, which extends parallel to the axis of the hub, all of these studs being arranged at equal distances from the axis of the hub. Each flange, 11, has a hole, 19, through which the stud, 12, extends and a counter-bored recess, 18, surrounding this hole in the outer face of the flange. The stud, 12, preferably has a cylindrical collar or shoulder, 17, which seats in the recess, 18, and the stud is secured in place by the nut, 13, screwed upon its inner end and engaging the inner face of the flange, 11. Nuts, 14, are screwed upon the outer ends of the studs, 12, and have convex seating surfaces which cooperate with the wheel disc, as we shall presently describe. The outer surface of the hub, 10, is provided with radial grooves, 16, which extend longitudinally of the hub and which are open at their front ends between the flanges, 11. In order to reduce the weight of the hub, we find it desirable to provide the radial flanges, 15, forming the side walls of these grooves.

The body of the wheel is formed by a wheel disc composed of a plurality of segmental, sheet-metal stampings, 21, which are assembled to form the wheel disc. Each of these segmental stampings has a body portion which is inclined, somewhat, as shown in Figs. 2 and 8. From the sides of the body portion of each section, flanges 24, project laterally. From the outer edge of each section a curved flange, 25, also projects laterally. The inner edge portion, of each segment, 21, has a curved, hollow rib, 22, pressed therein and is provided with an inner, curved, lateral flange, 26, which is relatively short. A depression or concave recess, 23, is pressed in the curved rib, 22, of each section, and each recess is centrally perforated. The several segmental sections, 21, are assembled so that the body portions are in line with each other and the side flanges, 24, of adjacent sections are in contact with each other throughout their length. These side flanges, 24, are then rigidly united, for example, by the spot welds, 27 and the segmental sections are thus held together, forming a complete wheel disc. When the sections are thus assembled, the curved flanges, 25, of the several sections are in line with each other and together form an annular surface at the periphery of the wheel disc, serving as a support for the rim. The curved ribs, 22, pressed in the several sections, 21, are also in line with each other, forming a hollow, annular rib around the center of the wheel disc. The rim, 28, carrying the tire, 29, is rigidly secured to the cylindrical rim support formed by the curved flanges, 25, of the several sections, for instance, by riveting thereto. The wheel disc thus formed by assembling and uniting the several segmental sections, 21, may be detachably secured to the hub by means of the studs, 12, and the ball-nuts, 14. The wheel disc may be mounted on the hub by sliding the inner ends of the mating flanges, 24, rearwardly in the grooves, 16, until the outer face of each hub flange, 11, engages the rear face of each section, 21, adjacent the rib, 22. This mounting movement causes the studs, 12, to pass through the perforations of the depressions, 23, and the ball nuts, 14, are then screwed upon the studs until the convex surfaces of the nuts seat in the depressions, 23.

The torsional or driving and braking forces acting on the wheel are transmitted from the several studs to the rim directly through the metal of the several sections, 21, which, of course, has a great deal of strength to resist any elongation due to such torsional strains. The lateral flanges, 24, together with the curved flange, 25, at the outer edge of each section, gives each segmental section the characteristics of a column and the radial load acting on the wheel is taken by these several sections, acting as columns, as in a spoked wheel of the compression type. The side thrusts acting on the wheel are adequately met due to the fact that the inner ends of the flanges, 24, seat on the surface of the hub and act as buttresses to prevent any deflection of the sections due to these side stresses.

It will be observed that the several sections going to make up the wheel disc are simple stampings which are comparatively small and which can, therefore, be produced at relatively low cost and with small die expense. Due to the fact that a great deal of the strength of the wheel is provided by the flanges on the several sections, these sections may be made of relatively light-weight metal, thus reducing the weight and the cost of the wheel. The spot welds which unite the mating flanges of the several sections do not have to resist any of the forces acting on the wheel in use and are merely for the purpose of holding the sections in assembled position so that the use of these welds does not detract from the strength of the wheel. We have shown a wheel disc made up of six segmental sections but we are not to be restricted to this arrangement as a greater or less number of sections may be used.

We are aware that this embodiment of our invention is susceptible of considerable variation without departing from the spirit thereof and, therefore, we claim our invention broadly, as indicated by the appended claims.

Having thus described our invention, what we claim as new and desire to secure by Letters Patent is:—

1. A wheel body comprising a plurality of segmental sections each consisting of a sheet of metal having its side portions bent at right angles to form radial side flanges and its outer edge portion bent laterally into a continuous curved flange to form a rim support, said segmental sections being assembled to form the wheel body with the radial side flanges of adjacent sections in contact and integrally united, and means for securing said wheel body to the hub, comprising apertures adjacent the central portion of the wheel body, each of said apertures being arranged between the radial side flanges of one of said sections.

2. A wheel comprising a hub, a plurality of segmental sections, each consisting of a sheet of metal having its side portions bent at right angles to form radial side flanges and its outer end portion bent laterally into a continuous curved flange of uniform width perpendicular to said radial flanges, said segmental sections being assembled to form a wheel disc with the radial side flanges of adjacent sections in contact and integrally united, and the curved flanges in alignment forming a cylindrical rim support, each of said sections having an aperture adjacent the hub portion thereof and intermediate said side portions, means adapted to enter said aperture for securing each section to the hub, and a rim mounted on said rim support.

3. A wheel comprising a hub, a plurality of segmental sheet metal sections assembled and rigidly united to form a wheel disc, each section having a perforated depression adjacent the hub portion and intermediate the side edges thereof, threaded studs carried by said hub and extending through the perforations of said depressions, nuts screwed on said threaded studs and having convex surfaces seating in said depressions, and a rim mounted on the periphery of said wheel disc.

4. A wheel comprising a hub, a plurality of segmental, sheet metal sections assembled and rigidly united to form a wheel disc, each section being provided with a continuous curved flange at its outer edge, a curved rib pressed in the metal of the section near its inner edge and a perforated depression formed therein, said sections being so assembled that the flanges and ribs of adjacent sections are aligned forming an annular rib and an annular rim support concentric with each other, threaded studs carried by said hub and extending through said perforated depressions, ball nuts screwed on said studs and seating in said depressions, and a rim mounted on said rim support.

5. A wheel comprising a hub, a plurality of segmental sheet metal sections, each provided with laterally-extending flanges at the sides of the section, a continuous curved, lateral flange at the outer edge of the section and a perforated depression, said sections being assembled to form a wheel disc with the lateral flanges of adjacent sections in contact and rigidly united, said side flanges extending radially of the wheel disc, and engaged in recesses formed in the wheel hub, threaded studs carried by said hub and extending through said perforated depressions, convex nuts screwed on said studs and seating in said depressions, and a rim rigidly secured to the curved flanges of said sections.

6. A wheel comprising a hub, a plurality of segmental, sheet metal sections, each section having an inclined body portion, lateral flanges projecting from the sides of the section, a continuous curved flange projecting laterally from the outer edge of the section and a perforated depression positioned between the inner ends of said side flanges, said sections being assembled to form a dished wheel disc with the side flanges of adjacent sections in contact, rigidly united and extending radially of the disc, threaded studs carried by said hub and extending through said perforated depressions, convex nuts screwed on said studs and seating in said depressions, and a rim rigidly secured to said curved flanges.

7. A wheel comprising a hub having a plurality of radially-extending flanges, a plurality of segmental sheet metal sections, each section having lateral flanges projecting from the sides thereof, said sections being assembled to form a wheel disc with the flanges of adjacent sections in contact, rigidly united and extending radially of the disc, said contacting flanges being positioned between adjacent hub flanges with the inner ends of the disc section flanges seating on the hub, bolts securing each section to one of said hub flanges, and a rim mounted on the periphery of said disc.

8. A wheel comprising a hub having a plurality of radially-extending flanges and a plurality of radial grooves, a plurality of segmental sheet metal sections, each section having lateral flanges projecting from the sides thereof, said sections being assembled to form a wheel disc with the flanges of adjacent sections in contact, rigidly united and extending radially of the disc, the sheet metal sections being positioned in front of the hub flanges with the lateral flanges extending between the hub flanges and seating in said radial grooves, bolts connecting each segmental section to a hub flange, and a rim mounted on the periphery of said disc.

9. A wheel comprising a hub having a plurality of radially-extending flanges and a plurality of radial grooves, a plurality of segmental sheet metal sections, each having lateral flanges projecting from the sides thereof and a perforated depression, said sections being assembled to form a wheel disc with the flanges of adjacent sections in contact, rigidly united and extending radially of the disc, the sheet metal sections engaging the front of the hub flanges with the lateral flanges extending between the hub flanges and seating in said radial grooves, a threaded stud carried by each hub flange and extending through one of the perforated depressions, convex nuts screwed on said studs and seating in said depressions, and a rim mounted on the periphery of the disc.

10. A wheel comprising a hub having a plurality of radially-extending flanges and a plurality of radial grooves, a plurality of segmental, sheet metal sections, each section having an inclined body portion, lateral flanges projecting from the sides of the section, a curved flange projecting laterally from the outer edge of the section and a perforated depression positioned between the inner ends of said side flanges, said sections being assembled to form a dished wheel disc with the flanges of adjacent sections in contact, rigidly united and extending radially of the disc, the sheet metal sections engaging the front of the hub flanges with the lateral flanges extending between the hub flanges and seating in said grooves, threaded studs carried by said hub flanges, ball nuts screwed on said studs and seating in said perforated depressions, and a rim rigidly secured to said curved flanges.

11. A wheel comprising a hub having a plurality of radially disposed depressions, a plurality of segmental sheet metal sections, each provided with laterally extending side and end flanges, the end flanges being curved and bent laterally into contact with the outer ends of said side flanges, said sections being assembled and secured together with the side flanges of adjacent sections in contact with each other and the curved end flanges forming a cylindrical rim support, said side flanges being adapted to engage in the radially disposed depressions of said hub, and a rim mounted on said end flanges.

In testimony whereof, we affix our signatures.

WALTER M. TROUT.
CLARENCE B. DES JARDINS.